United States Patent [19]

Sijtstra

[11] Patent Number: 5,791,840
[45] Date of Patent: Aug. 11, 1998

[54] METHOD OF PRODUCING A CROWN WHEEL

[75] Inventor: Anne Lourens Sijtstra, Rotterdam, Netherlands

[73] Assignee: Crown Gear B.V., Enschede, Netherlands

[21] Appl. No.: 454,367

[22] PCT Filed: Apr. 8, 1994

[86] PCT No.: PCT/NL94/00073

§ 371 Date: Jun. 6, 1995

§ 102(e) Date: Jun. 6, 1995

[87] PCT Pub. No.: WO94/23880

PCT Pub. Date: Oct. 27, 1994

[30] Foreign Application Priority Data

Apr. 8, 1993 [NL] Netherlands .................... 9300617

[51] Int. Cl.[6] .................................................. B23F 1/00
[52] U.S. Cl. .................................................. 409/12; 409/51
[58] Field of Search .................................... 409/11, 12, 20, 409/23, 24, 51

[56] References Cited

U.S. PATENT DOCUMENTS

| | | | |
|---|---|---|---|
| 1,140,610 | 5/1915 | Reinecker | 409/12 |
| 2,669,904 | 2/1954 | Bloomfield | 90/1.6 |
| 3,184,988 | 5/1965 | Osplack | 74/457 |
| 4,587,766 | 5/1986 | Miyatake et al. | 409/12 |
| 4,650,378 | 3/1987 | Zubler | 409/12 |

FOREIGN PATENT DOCUMENTS

| | | | |
|---|---|---|---|
| 425 086 | 3/1926 | Germany . | |
| 0 104 687 | 11/1926 | Germany . | |
| 238935 | 8/1925 | United Kingdom | 409/11 |
| 338436 | 11/1930 | United Kingdom | 409/12 |
| 91 04819 | 4/1991 | WIPO . | |
| 92 11967 | 7/1992 | WIPO . | |

OTHER PUBLICATIONS

Japanese Abstract—Fanuc, K.K. and Takaomi Fukuyama, Helical Crowning Control Method in Gear Hobbing Machine—No. 60-80520—Aug. 5, 1985 (Patent Abstracts of Japan, vol. 9, No. 223 (M-411) (1946).

Dr. G. Sulzer, Economics of CNC Gear Hobbing—Gear Technology (1987) Mar./Apr., No. 2, pp. 42-46.

George Sanborn, Ben Bloomfield, Effect of Axis Angle on Tapered Gear Design—Product Engineering—Feb. 1950, pp. 129-132.

*Primary Examiner*—Daniel W. Howell
*Attorney, Agent, or Firm*—Deveau, Colton & Marquis

[57] ABSTRACT

Method of producing a conical or cup-shaped crown wheel which can mesh with a cylindrical pinion with the inclusion of an angle α. The crown wheel is produced by means of a generating process. The tool (1, 43) consists of a disc (3) which has machining elements (53) disposed on its circumference whose cutting edges lie in the surface of a profile which extends in the form of helical ribs (4) at a pitch angle γ around the circumference of the disc (3), said profile in each cross-sectional plane perpendicular to the helical direction of the ribs (4) being the shape of a number of adjacent cuttting teeth (53), based on the basic geometry of a cylindrical pinion which is characteristic of the crown wheel and the center point of which lies on a circle which is in a plane perpendicular to the rotation shaft of the tool, and has a center point lying on the rotation shaft of the tool. During the generating process the tool (1, 43) is positioned in such a way that the center point (5, 47) of the cutting teeth (53) which are in engagement with the workpiece (20, 38) lies essentially in the plane which is formed by the axis of rotation (22, 39) of the workpiece and the center point of the tool (1, 43) lying on the rotation shaft (2, 46) of the tool and said center point (5, 47) is moved in a straight line which intersects or crosses the axis of rotation (22, 39) of the workpiece (20, 38) with the inclusion of the angle α.

6 Claims, 4 Drawing Sheets

5,791,840

METHOD OF PRODUCING A CROWN WHEEL

The present invention relates to a method of producing a conical or cup-shaped crown wheel which can mesh with a cylindrical pinion whose axis of rotation intersects or crosses the axis of rotation of the crown wheel with the inclusion of an angle α deviating from 90°, the crown wheel being produced, starting from a workpiece, by means of a generating process in which a tool and the workpiece rotate at a constant ratio of rotation speeds and are moved relative to each other in such a manner that the tool continuously works the workpiece.

For a proper understanding of the present invention, it is pointed out that a crown wheel which can mesh with a cylindrical pinion in a mutual position of the axes of rotation in which the angle α lies between 0° and 90° is referred to as a conical crown wheel, and if the angle α lies between 90° and 180°, it is referred to as a cup-shaped crown wheel.

A generating process for producing conical and cup-shaped crown wheels is known from U.S. Pat. No. 3,184,988. In the case of this known method the tool used is a hobbing cutter whose working profile, viewed in the direction of the axis of the cutter, is a rack profile, which is also usual in the case of tools for working involute cylindrical pinions. As a result of the hobbing cutter used, the known method produces crown wheels whose teeth are characterized by barrel-shaped tooth flanks. Crown wheels with barrel-shaped tooth flanks have the disadvantage that they can be loaded only to a limited degree, through the fact that the tooth flanks do not always come into contact over the entire tooth width with the cylindrical pinion which meshes with the crown wheel.

For the production of crown wheels, it is preferable to use a hobbing cutter of the type described in the publication WO 91/04819. However, the way in which the workpiece from which the crown wheel is produced and the tool have to be positioned and moved relative to each other for accurate production of a conical or cup-shaped crown wheel with the desired teeth is not known from the prior art.

The object of the present invention is therefore to propose measures which provide a method for producing improved conical or cup-shaped crown wheels.

This object is achieved by a method of the type mentioned in the introduction which is characterized by the characterizing part of claim 1. According to this measure, the tool is positioned relative to the workpiece in such a manner that the rotation shaft of the tool runs parallel to the surface of the part of the workpiece to be worked. This means that the tool is symmetrically loaded, and the wear on the tool is minimal. The method proposed in claim 1 can advantageously be used for producing a crown wheel which can mesh with a cylindrical pinion in the case of which the axes of rotation of the crown wheel and of the cylindrical pinion intersect each other.

The present invention also provides a method of the type mentioned in the introduction, which is characterized by the characterizing part of claim 2. This method is particularly advantageous for the production of a crown wheel which can mesh with a cylindrical pinion in the case of which the axes of rotation of the crown wheel and of the cylindrical pinion cross each other. This situation is generally known as "off-centre". The method according to claim 2 is simple to carry out and leads to accurate results. The symmetrical loading of the tool is not achieved for all points of the tooth width of the crown wheel, but on average uniform wear still occurs.

The measure according to claim 3 describes the way in which the desired positioning of the tool can be achieved on a universal gear hobbing machine, while the feed motion of the tool is described in claim 4.

Claims 5, 6 and 7 describe the exact values of the envisaged settings.

The method according to the present invention will be explained in greater detail below with reference to the drawing, in which.

Figure 1:
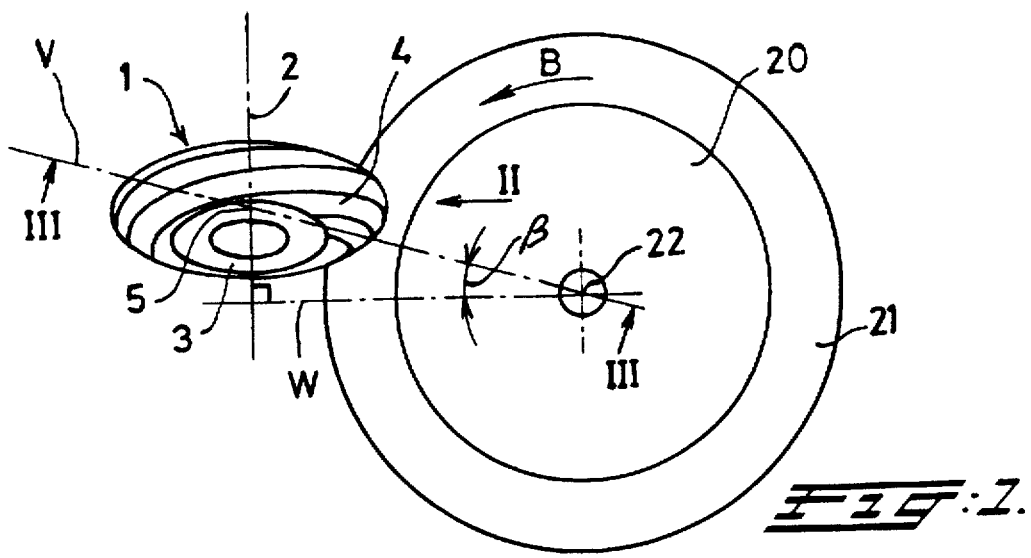
FIG. 1 shows a diagrammatic representation from above of the movement of the tool relative to the crown wheel to be produced, which crown wheel can mesh with a pinion whose axis of rotation intersects the axis of rotation of the crown wheel.
Figure 2:
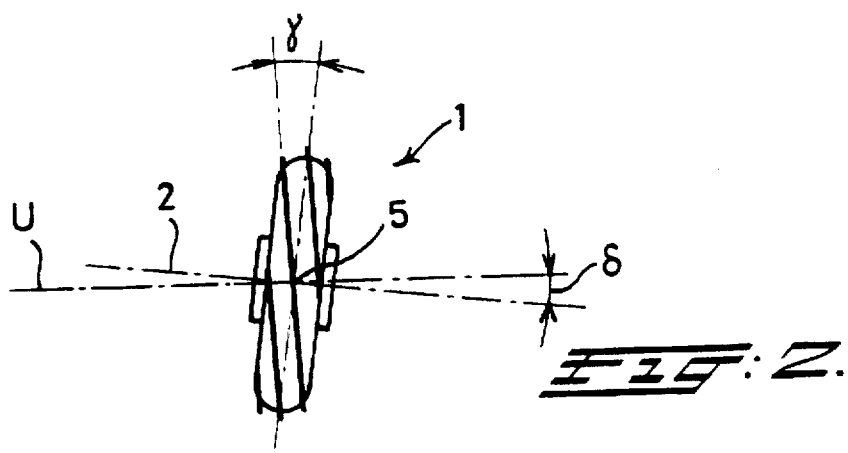
FIG. 2 shows a representation of the position of the tool in a view in the direction of arrow II in FIG. 1.
Figure 3:
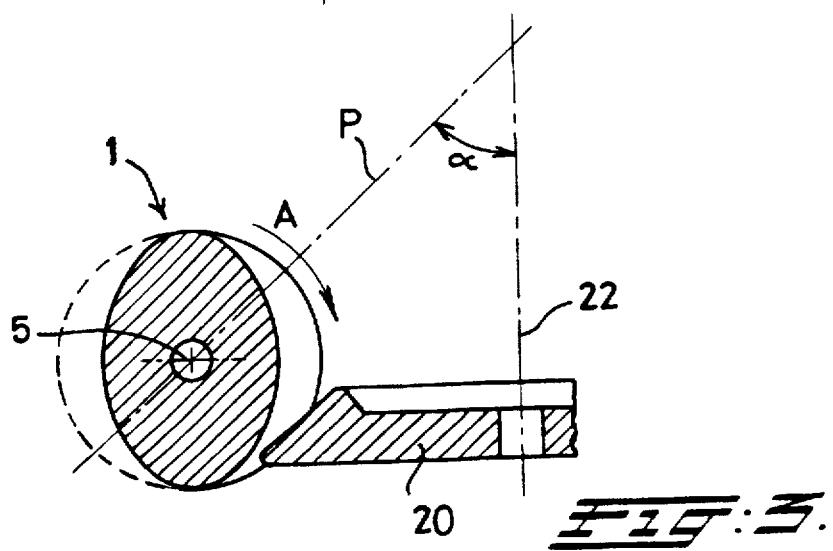
FIG. 3 shows a diagrammatic section along the line III—III in FIG. 1.

FIGS. 1, 2 and 3 show a cutter 1 for the production of a crown wheel from a workpiece 20 using the method according to the invention. The crown wheel to be produced in this example is a conical crown wheel which can mesh with a cylindrical pinion with spur toothing, with the inclusion of an angle a between the intersecting axes of rotation of the cylindrical pinion and of the crown wheel, the angle α lying between 0° and 90°.

The cutter 1, which is shown only diagrammatically in the drawing, consists of a disc 3 which is rotatable about its rotation shaft 2 and has machining elements disposed on its circumference whose cutting edges lie in the surface of a profile which extends essentially in the form of helical ribs 4 at a pitch angle γ around the circumference of the disc 3. In this case, said profile in each cross-sectional plane perpendicular to the helical direction of the ribs 4 is the shape of a number of adjacent cutting teeth, which profile shape is based on the basic geometry of a cylindrical pinion having involute teeth which is characteristic of the crown wheel to be produced, the centre of whose base circle lies on a circle which is in a plane perpendicular to the rotation shaft 2 of the cutter, and has a centre point 5 lying on the rotation shaft 2 of the cutter. Instead of the cutter 1, a grinding tool corresponding to the above description could also be used for carrying out the method.

The envisaged teeth are provided in a tooth region 21 of the workpiece 20 by means of a generating process. In this case the cutter 1 rotates about its rotation shaft 2 in the direction of arrow A, and the workpiece 20 rotates about its axis of rotation 22 in the direction of arrow B. The ratio of the rotation speeds of the cutter 1 and the workpiece 20 is constant during the generating process, and the cutter 1 works continuously on the workpiece 20.

During the generating process, the centre point 5 on the rotation shaft 2 of the cutter 1 is moved relative to the workpiece 20 in a first plane V which comprises the axis of rotation 22 of the workpiece 20. The first plane V forms an angle β with a second plane W, which likewise comprises the axis of rotation 22 of the workpiece 20. The second plane W forms a right angle (90°) with the rotation shaft 2 of the tool 1.

FIG. 2 shows clearly that the rotation shaft 2 of the cutter 1 forms an angle δ with a plane U extending at right angles to the axis of rotation 22 of the workpiece 20.

FIG. 3 shows that the centre point 5 of the cutter 1 is moved along a line p in the plane V, which line forms an angle equal to the angle α with the axis of rotation 22 of the workpiece 20.

In order to produce the crown wheel, the tool 1 is moved relative to the workpiece 20 in such a manner that the following applies for the angle β between the first plane V and the second plane W: $\beta = \text{arctg}(-\sin\alpha \cdot \text{tg}\,\gamma)$. Prior to the generating process, the angle δ is set in such a manner that the following applies: $\delta = \text{arctg}(\cos\alpha \cdot \text{tg}\,\gamma \cdot \cos\beta)$.

The description given above is based on a crown wheel which can mesh with a cylindrical pinion with spur toothing. In that case, at the place where the cutter 1 is in engagement with the workpiece 20, the helical ribs 4 of the cutter 1 lie in principle parallel to the plane V. However, the present method can also be used to produce a crown wheel which can mesh with a cylindrical pinion with helical toothing. In this case then, at the place where the cutter 1 is in engagement with the workpiece 20, an angle corresponding to the tooth angle of the characterizing cylindrical pinion is present between the helical ribs 4 of the cutter 1, on the one hand, and the plane V, on the other.

Figure 4:
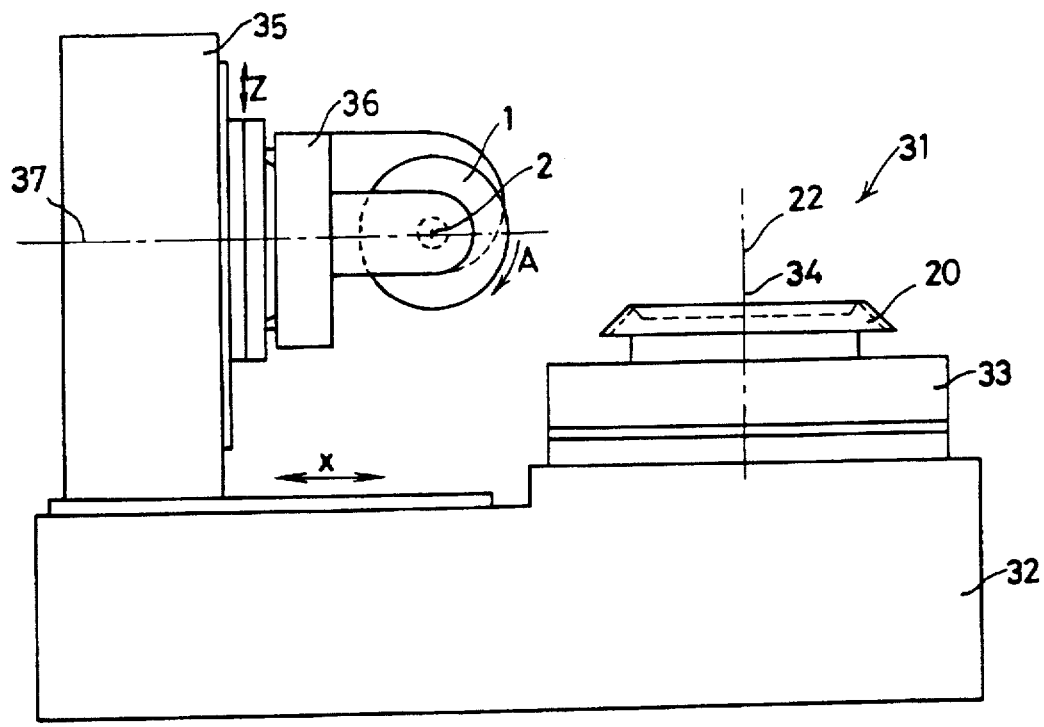
FIG. 4 shows a diagrammatic side view of a device for carrying out the method according to the invention.
Figure 5:
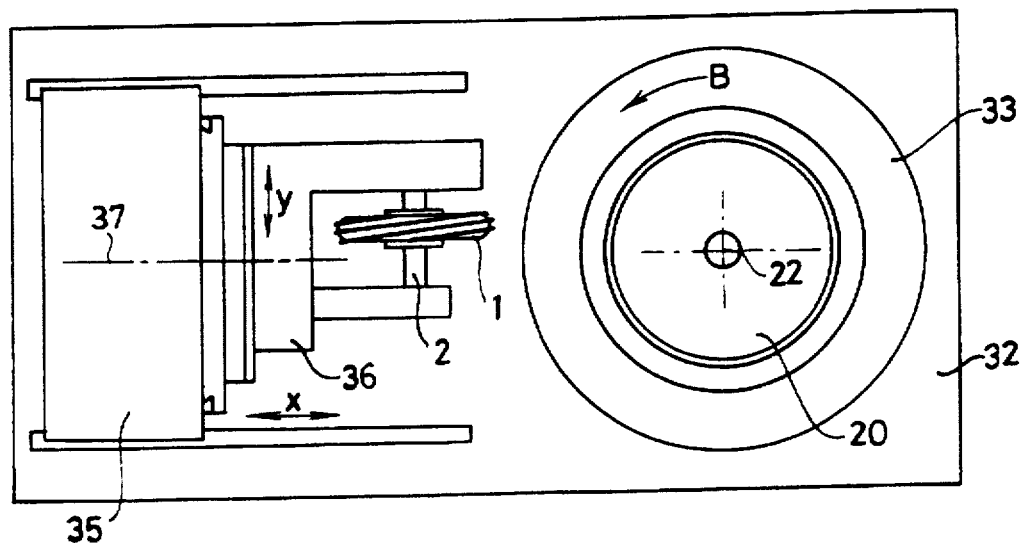
FIG. 5 shows a diagrammatic top view of the device in FIG. 4.

FIGS. 4 and 5 show an example of a device which is suitable for producing crown wheels using the method according to the invention. The device comprises a miller (milling machine) 31 having a bedplate 32. A turntable 33, on which the workpiece 20 can be fixed, is mounted on the bedplate 32. The miller 31 is provided with a drive (not shown), in order to rotate the turntable 33 about axis of rotation 34. The workpiece 20 is placed on the turntable 33 in such a manner that the axis of rotation 22 of the workpiece 20 coincides with the axis of rotation 34 of the turntable 33. The miller 31 furthermore comprises a column 35 which can be moved in the direction of arrow X by means of a drive which is not shown. A milling head 36 is attached to the column 35, which milling head 36 can be tilted relative to the column 35 about an axis 37. The milling head 36 can also be moved relative to the column 35 in the direction of the arrow Y and the arrow Z. The rotation shaft 2 of the tool 1 is rotatably mounted in the milling head 36 by both its ends. The rotation shaft 2 can be driven in the direction of arrow A. Using such a device, a crown wheel can be produced according to the method described by reference to FIGS. 1, 2 and 3 by means of the cutter 1, or using a tool corresponding to the description given thereof.

In another embodiment of the method according to the invention, the following applies to the angle δ: $\delta = \gamma \cdot \cos\alpha$, and the following to the angle β: $\beta = \text{arctg}(-\sin\alpha \cdot \text{Tg}\,\gamma)$. This embodiment simplifies the calculation of the value of δ and gives satisfying results in practice in respect of the tooth shape of the crown wheel.

Figure 6:
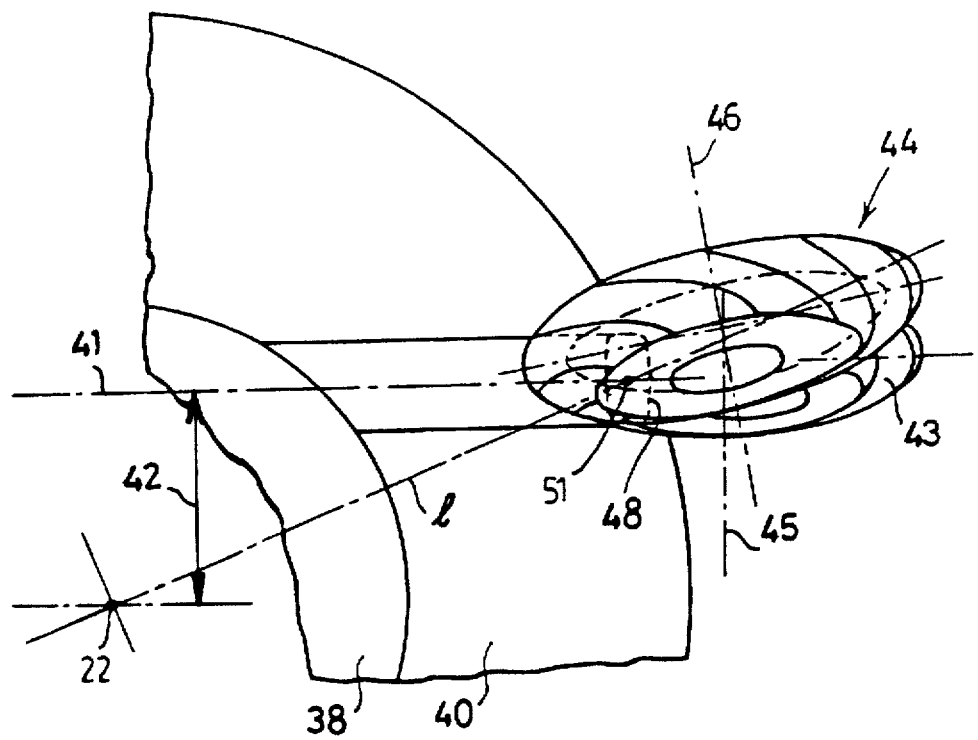
FIG. 6 shows a diagrammatic view of the production, by means of a hobbing cutter, of a conical crown wheel which can mesh with a cylindrical pinion, in the case of which the axes of rotation of the crown wheel and the cylindrical pinion cross each other.

FIG. 6 shows a part of a workpiece 38 to be worked to a conical crown wheel, and having an axis of rotation 22. The outer surface 40 of the workpiece 38 is to be provided with the desired teeth. The crown wheel to be produced in this way can mesh with a cylindrical pinion (not shown), the axis of rotation 41 of which crosses the axis of rotation 22 of the crown wheel at the distance 42. For the provision of the teeth on the workpiece 38 in the manner according to the present invention, the workpiece 38 is worked with a hobbing cutter 43. The hobbing cutter 43 is of the type which is described with reference to FIGS. 1–3. The cutter 43 is suitably positioned, in order to ensure that the spirally placed teeth on the outer surface of the cutter 43 at the position of the engagement region 48 with the workpiece 38 run in the direction of the teeth of the cylindrical pinion (not shown). Achieving the desired positioning and the effect envisaged thereby is explained in conjunction with FIG. 7.

Figure 7:
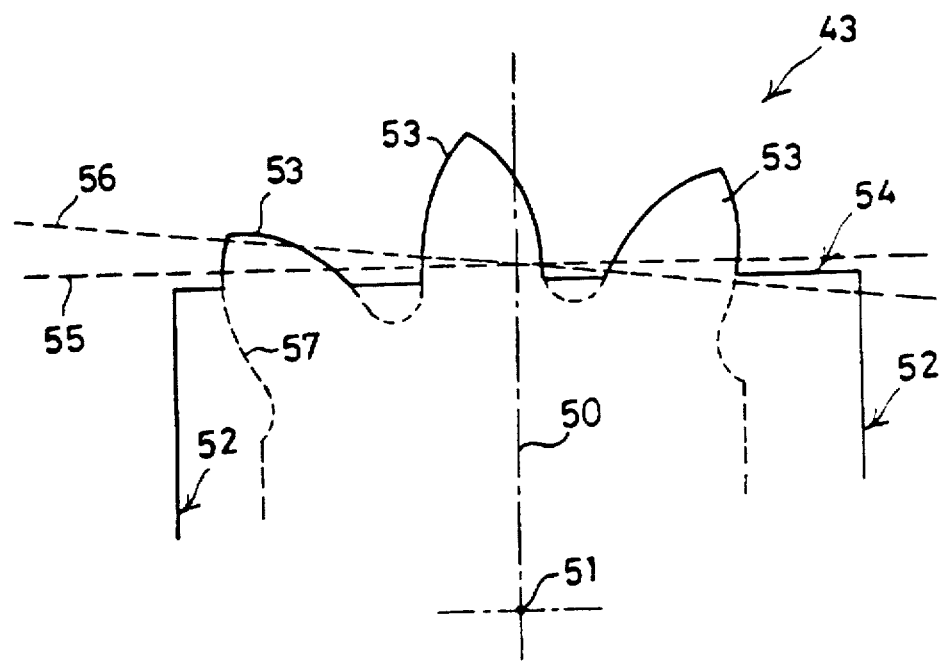
FIG. 7 shows a section of the hobbing cutter in FIG. 6, in which the teeth are shown in the way in which they engage with the outer surface of the conical crown wheel.

FIG. 7 shows a section of a part of the cutter 43. The cutter 43 has cutter teeth 53 which have a profile with a profile centre point 51. The profile of the cutter teeth 53 is derived from the cylindrical pinion which can mesh with the crown wheel. The profile centre point 51 lies on a circle in the middle 50 of the cutter 43. In order to give the cutter teeth 53 as much stability as possible, the outer circumference 54 of the cutter 43 is kept as large as possible in this example, and the cutter 43 can also have the narrower contour 57.

The line 55 indicates the tangent to the surface 40 of the workpiece 38 to be worked when the cutter 43 is positioned at right angles to said surface 40 to be worked. If there is a changeover to off-centre cutting while the position of the rotation shaft of the cutter is retained, the tangent to the surface of the workpiece 38 will run in accordance with the line 56 after the cutter 43 has been placed off centre. This is an undesirable situation, because the cutter teeth 53 will be loaded asymmetrically as a result, and because uneven wear will occur. In the case of the method according to the present invention, in order to avoid this undesirable situation, the rotation shaft of the cutter 43 is rotated from the position 45, about centre point 51 of the cutter teeth in engagement with the workpiece 38, to the position 46. This makes the centre point 51, the centre point 5 of the cutter 43 situated on the axis of rotation of the cutter 43, and the axis of rotation 22 of the crown wheel to be produced go into one plane. This plane is indicated by "1" in FIG. 6. The position of the cutter 43 obtained is indicated in FIG. 6 by position 44. This suitable positioning means that the cutter 43 works the workpiece uniformly and that symmetrical wear occurs in the process.

Figure 8:
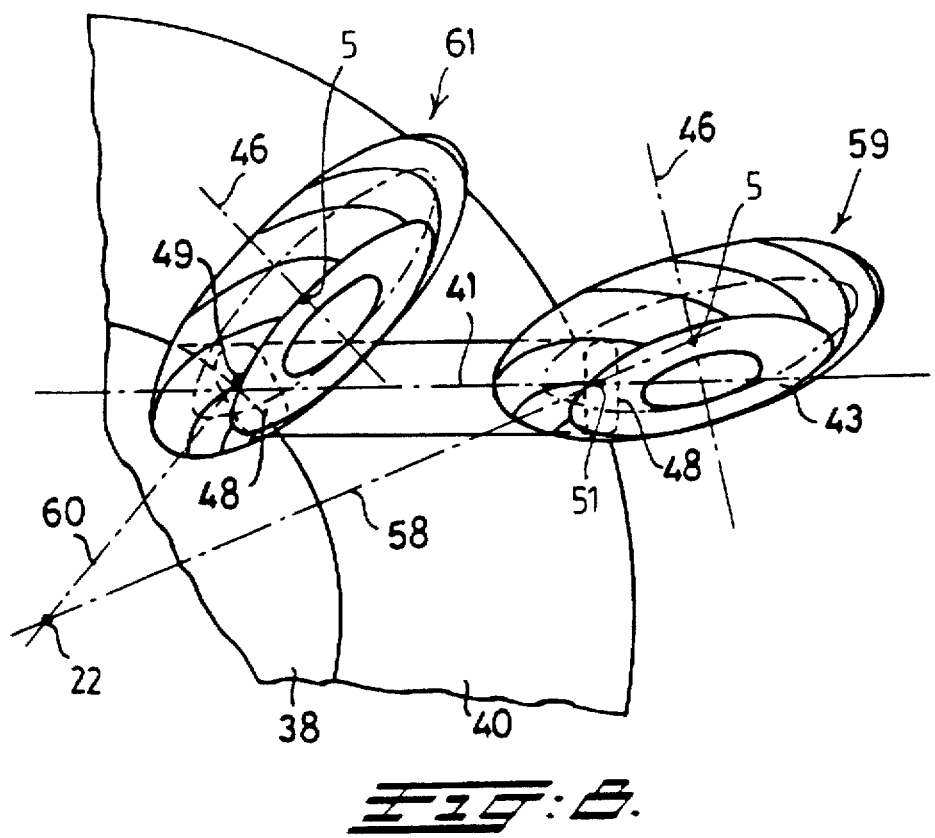
FIG. 8 shows the same operation as that in FIG. 6, in the case of which the hobbing cutter is held over the entire width of the tooth at right angles to the surface of the workpiece.

In the case of the method according to the invention indicated diagrammatically in FIG. 8, the above-described positioning of the cutter 43 is maintained during working of the workpiece 38. This means that the cutter 43 is in the position indicated by 59 at the start of working, which position corresponds to the position 44 shown in FIG. 6, and is in the position indicated by 61 on the completion of working. It can be seen clearly from FIG. 8 that during working of the outer surface 40 from the large diameter to the small diameter the centre point 51 of the cutter teeth which are in engagement with the workpiece moves along the axis of rotation 41 of the cylindrical pinion which can mesh with the crown wheel to be produced. As already mentioned, the centre point 5 of the cutter 43, the centre point 51 of the teeth of the cutter 43 and the axis of rotation 22 of the workpiece 38 remain in one plane during the generating process. In the position 59 of the cutter 43 this plane is 58, and in the position 61 this plane is 60.

This means that in the case of the method followed here the cutter 43 carries out a rotation about the centre point 51 of the meshing cutter teeth during the movement from large diameter to small diameter. In order to achieve this, the relative movement between cutter 43 and workpiece 38 must acquire an additional rotation which is comparable to the differential movement during working of helical toothed cylindrical pinions. When the device shown in FIGS. 4 and 5 is used, this means that it is necessary to rotate the cutter head 36 about the axis of rotation 37 during production of the toothing on the workpiece.

Figure 9:
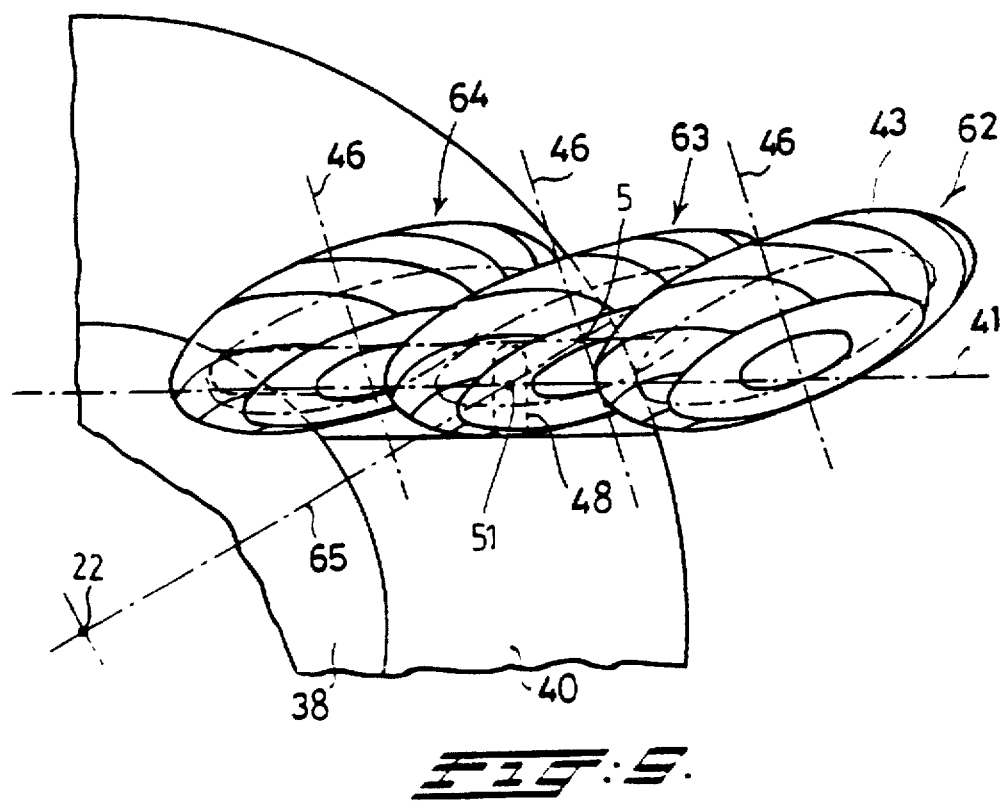
FIG. 9 shows the same operation as that in FIG. 6, in the case of which the hobbing cutter is moved in one plane parallel to the axis of rotation of the workpiece.

FIG. 9 shows diagrammatically a method according to the invention for the production of a crown wheel which can mesh with a cylindrical pinion (not shown) which is placed off centre. In the case of this method, unlike the method described with reference to FIG. 8, the centre point 5 of cutter 43 situated on the rotation shaft of the cutter, the centre point 51 of the meshing cutter teeth, and the axis of rotation 22 of the workpiece 38 during working of the workpiece lie only in one position, for example in the centre of the outer surface 40 (position 63 of the cutter 43) in one plane 65. Furthermore, it can be seen clearly from FIG. 9 that the cutter 43 is moved from position 62 to position 64 in a straight line, parallel to the axis of rotation 41 of the cylindrical pinion which can mesh with the crown wheel. The result of this is that in positions 62 and 64, for example, the cutter is not in a position accurately at right angles to the surface of the workpiece to be worked, but on average it is in such a position, so that the wear on the cutter remains acceptable. Due to the fact that the cutter moves in one plane, the rotation of the cutter head 36 about the axis of rotation 37 in the case of the method described with reference to FIG. 8 can be dispensed with.

I claim:

1. Method of producing a conical or cup-shaped crown wheel which can mesh with a characteristic cylindrical pinion having a tooth profile and a pinion center, which pinion has an axis of rotation which intersects or crosses the axis of rotation of the crown wheel with the inclusion of an angle $\alpha$ deviating from 90 degrees, the method comprising a generating process in which a tool and a workpiece rotate at a constant ratio of rotation speeds and are moved relative to each other in such a manner that the tool continuously works the workpiece, wherein the tool comprises a disc which is rotatable about its rotation shaft and has machining elements disposed on its circumference whose cutting edges lie in the surface of a profile which extends essentially in the form of helical ribs at a pitch angle $\gamma$ around the circumference of the disc, said ribs forming in each cross-sectional plane perpendicular to the helical direction of the ribs a profile section having the shape of a number of adjacent cutting teeth which have a profile center point, the shape of the profile section being based on the basic geometry of the characteristic cylindrical pinion and said profile center point being identical to said pinion center and lying on a circle in a plane perpendicular to the rotation shaft of the tool, which circle has a circle center point lying on the rotation shaft of the tool, which circle center point forms a tool center point of the tool, wherein the tool is positioned relative to the workpiece in such a way that at least for one point during the working of the workpiece the profile center point of the adjacent cutting teeth which are working the workpiece lies essentially in a first plane defined by the axis of rotation of the workpiece and the tool center point, and wherein the tool is moved with respect to the workpiece throughout the working of the workpiece such that the profile center point of the adjacent cutting teeth which are working the workpiece is moved in a first straight line which intersects or crosses the axis of rotation of the workpiece with the inclusion of the angle $\alpha$.

2. Method according to claim 1, wherein the tool is positioned relative to the workpiece in such a way that throughout the working of the workpiece the profile center point of the adjacent cutting teeth which are working the workpiece lies essentially in said first plane.

3. Method according to claim 1, wherein said characteristic cylindrical pinion has a tooth angle, and wherein during the working of the workpiece the tool is positioned relative to the workpiece through pivotal movement of the rotation shaft of the tool about a pivot axis which is directed at right angles to the rotation shaft of the tool and the first straight line, such that the helical ribs of the tool are brought into an angle with said first plane corresponding essentially to the tooth angle of the characteristic cylindrical pinion.

4. Method according to claim 1, wherein during the generating process the tool center point is moved along a second straight line parallel to said first straight line.

5. Method according to claim 1, wherein said first plane forms an angle $\beta$ with a second plane, which second plane comprises the axis of rotation of the workpiece and forms a right angle with the rotation shaft of the tool, and wherein the rotation shaft of the tool forms an angle $\delta$ with a third plane extending at right angles to the axis of rotation of the workpiece, and wherein the following applies for the angle $\beta$ between the first plane and the second plane:

$\beta$=arctan (−sin $\alpha$·tan $\gamma$), and wherein prior to the generating process the angle $\delta$ is set in such a way that the following applies:

$\delta$=arctan (cos $\alpha$·tan $\gamma$·cos $\beta$).

6. Method according to claim 1, wherein said first plane forms an angle $\beta$ with a second plane, which second plane comprises the axis of rotation of the workpiece and forms a right angle with the rotation shaft of the tool, and wherein the rotation shaft of the tool forms an angle $\delta$ with a third plane extending at right angles to the axis of rotation of the workpiece, and wherein the following applies for the angle $\beta$ between the first plane and the second plane: $\beta$=arctan (−sin $\alpha$·tan $\gamma$), and wherein prior to the generating process the angle $\delta$ is set in such a way that the following applies: $\delta$=($\gamma$·cos$\alpha$).

* * * * *